US00RE36121E

United States Patent [19]

Junier

[11] E Patent Number: Re. 36,121

[45] Reissued Date of Patent: Mar. 2, 1999

[54] PLUG VALVE

[75] Inventor: Marius Robert Junier, Houston, Tex.

[73] Assignee: Triten Corporation, Houston, Tex.

[21] Appl. No.: 971,918

[22] Filed: Nov. 18, 1997

Related U.S. Patent Documents

Reissue of:

[64] Patent No.: 5,540,253
Issued: Jul. 30, 1996
Appl. No.: 340,230
Filed: Nov. 16, 1994

[51] Int. Cl.[6] ..... B08B 9/02; B65G 53/40; F16K 41/04

[52] U.S. Cl. ..... 137/240; 137/375; 222/148; 251/214; 406/132

[58] Field of Search ..... 137/238, 240, 137/375; 134/166 C, 167 C, 168 C, 169 C; 222/148; 277/106; 406/128, 132, 133; 208/161, 164; 251/368; 422/139, 140

[56] References Cited

U.S. PATENT DOCUMENTS

| | | | |
|---|---|---|---|
| 2,378,607 | 6/1945 | Watts | 137/240 |
| 2,682,277 | 6/1954 | Marshall et al. | 137/240 |
| 4,535,801 | 8/1985 | Neale | 137/240 |
| 4,552,490 | 11/1985 | Neale | 137/240 |
| 4,827,967 | 5/1989 | Junier | 251/214 |

*Primary Examiner*—George L. Walton
*Attorney, Agent, or Firm*—James F. Weiler

[57] ABSTRACT

Disclosed is a plug valve adapted to be placed in a chamber or vessel containing fluidized particles to control flow of the fluidized particles between the chamber or vessel and the open end of a conduit which has a contained purging system in a sealed space between the valve stem and guide tube effective to keep the fluidized particles out of the space. A purging medium is provided under pressure to the sealed space as a backup and only purges the space of fluidized particles which enter it due to leakage of one or both of the stuffing boxes. Other features of the plug valve are described.

6 Claims, 5 Drawing Sheets

PLUG VALVE

Matter enclosed in heavy brackets [ ] appears in the original patent but forms no part of this reissue specification; matter printed in italics indicates the additions made by reissue.

FIELD OF THE INVENTION

This invention relates to control valves and particularly to a plug type control valve for controlling the flow of fluids or fluidized materials through a conduit, such as the powdered catalyst transfer lines and flew gas vent stacks employed in fluid catalytic cracking systems and in fluid catalytic hydroforming systems in the petroleum refining art.

BACKGROUND OF THE INVENTION

In the chemical and petroleum industries, fluid catalytic methods are employed in which finely divided catalyst particles are maintained suspended in a gas in the so-called "fluid state" under reaction conditions. Particles in the fluid state act in many ways like a liquid and undergo hindered settling. Thus, they may be conveyed from one vessel to another through a conduit, they develop a pressure head, etc.

Large units can operate continuously on-stream for extended periods of time under closely controlled conditions by employing fluid catalytic procedures. Catalysts in such units in processes where deposition of undesirable coke or other contaminant is encountered during the reaction state may be maintained at a predetermined level by continuously circulating the catalyst from the fluid reactor to a regenerator where such coke or contaminant is removed as by oxidative combustion. Fluid units of large capacity, such as throughput of 60,000 barrels or more of charge per day, are intended to operate on-stream for periods of as long as a year or more without being shut down.

Various applications involve high temperature operations in the chemical processing and petroleum refining arts including use in a converter such as a fluid catalytic cracking unit or a fluid catalytic hydroforming unit of conventional design having superimposed contact chambers in which the catalyst is maintained in a state of phase separation comprising an upper diffuse phase and a lower dense pseudo-liquid phase, the catalyst being withdrawn from the lower dense phase of the upper chamber through a vertical internal standpipe and discharged at a low point within the dense phase of the lower chamber and, after suitable treatment in the lower chamber, being returned upwardly through an internal vertical carrier line to the dense phase of the upper chamber.

By passing catalyst by gravity flow from an upper chamber to a lower chamber through a standpipe and passing the catalyst from the lower chamber to the upper chamber through a carrier line by aspiration into a stream of the gas to be contacted in the upper chamber, a continuous flow of the mixture through the carrier line is produced. In those cases where a regeneration zone is superimposed upon a conversion zone, the gas introduced into the carrier line is ordinarily air or other oxygen-containing gas. In those cases where the conversion zone is superimposed upon the regeneration zone, the gas introduced into the carrier line is a stream of vaporous hydrocarbons.

Flow control of catalyst from the standpipe into the dense phase of the lower chamber and from the latter into the carrier line for conveyance into the upper chamber is obtained by the use of plug valves positioned in the lower chamber engageable with the lower ends of the transfer lines, the plug valves having elongated valve stems extending through the chamber wall controlled in their longitudinal movement by external mechanical or manual operating means. These plug valves are used in oil refineries in controlling the flow of catalyst into a reaction chamber which is subject to temperature extremes, for example, in the range of 1500° F., as well as in other industrial applications wherein the valves are subject to oppositely directed displacements due to thermal expansion and spring forces.

Current vessel or container mounted plug valves for high temperature catalyst service are equipped with guide liners and bleed rings which guide the stem or stem tube and are purged continually by a purge medium. The purpose of the purge medium is to keep the catalyst (fluidized particles) out of the guide liners and bleed rings utilized with these valves.

There are a number of problems associated with plug valves having conventional continuous purging of bleed rings and guide liners. The valve stem or stem tube rubs against the guide liners and cause damage possibly resulting in sticking of the valve. The purges often do no operate properly, that is, the purging is excessive or inadequate. In the case of excessive purging, the guide tube, guide liners, and stem or stem tube erode. In the case of inadequate purging, the solid particles enter the guide liners and cause sticking of the valve stem or stem tube. Also, erosion of the plug closure member and valve seat are caused by high velocities of catalyst flow in the chamber or vessel in which the plug valve is disposed.

There has been a long felt need to overcome the problems associated with continuous purging of prior art plug valves as mentioned above. It is desirable and advantageous to provide a plug valve which overcomes the above-mentioned problems.

SUMMARY OF THE INVENTION

The present invention is directed to a plug valve adapted to be placed in a chamber or vessel to control flow of fluid between the chamber or vessel and an open end of a conduit by effecting closure between the chamber and the open end of the conduit which overcomes and solves the continuously purged plug valves.

A chamber or vessel mounted plug valve according to the present invention includes a plug closure member seatable in the open end of the conduit and is movable toward and away from the open end thereof. A stem or stem tube connected to the plug closure member is reciprocated for opening and closing the open end of the conduit, a portion of the stem being movable disposed within a guide tube and spaced apart therefrom, first and second stuffing boxes disposed in the spaced relationship adjacent ends of the guide tube, and a backup purge means for providing a purge medium under pressure in the space between the guide tube and the stem and between the first and second stuffing boxes which effectively contain the purging medium between them in the space which is effective to purge the space with the purge medium in the event of leakage of either or both of the first and second stuffing boxes. The first and second stuffing boxes are effective to guide and center the stem or stem tube in the guide tube.

A feature of the present invention is the provision of a removable shroud disposed about the stem and the first stuffing box effective to prevent erosion on the stem and the first stuffing box by fluids circulating in the chamber which otherwise would be exposed to the circulating fluid.

A further feature of the present invention is the provision of a refractory lining cast on the valve seat and on the plug rather than refractory materials set in hex mesh thereby providing better corrosion resistance than the traditionally used refractory material set in hex mesh.

A still further feature of the present invention is the provision of a shock dampener or absorber disposed under the cast refractory lining.

Accordingly, it is an object of the present invention to provide an improved plug valve which overcomes and solves the problems of continuously purged valves.

It is a further object of the present invention to provide such a plug valve which has a contained purge medium under pressure between an internal space between a guide member and the stem or stem tube which is effective to purge the space when the seal leaks.

A further object of the present invention is the provision of such a plug valve which has a pair of stuffing boxes adjacent the ends of a guide tube in which a portion of the stem for actuating the valve moves thereby providing a sealed space into which a purging medium is introduced under pressure and in which the purging medium serves to keep fluidized solids out of the space and as a back up that only starts purging the space when one or both of the seals leak.

A further object of the present invention is to provide such a plug valve which has a removable shroud disposed about the stem and the stuffing box effective to prevent erosion on the stem and the stuffing box within the shroud by fluid circulating in the chamber in which the plug valve is located.

A further object of the present invention is the provision of such a plug valve in which the guide tube effectively guides and centers the stem or stem tube in the guide tube.

A still further object of the present invention is to provide such a plug valve in which the plug and the valve seat have a refractory lining cast on each of them rather than the traditional refractory set in hex mesh.

A still further object of the present invention is the provision of shock dampening or absorbing means disposed under the cast refractory lining.

Other and further objects, features, and advantages of the invention are disclosed throughout the specification and claims.

DESCRIPTION OF PREFERRED EMBODIMENTS

Figure 1:
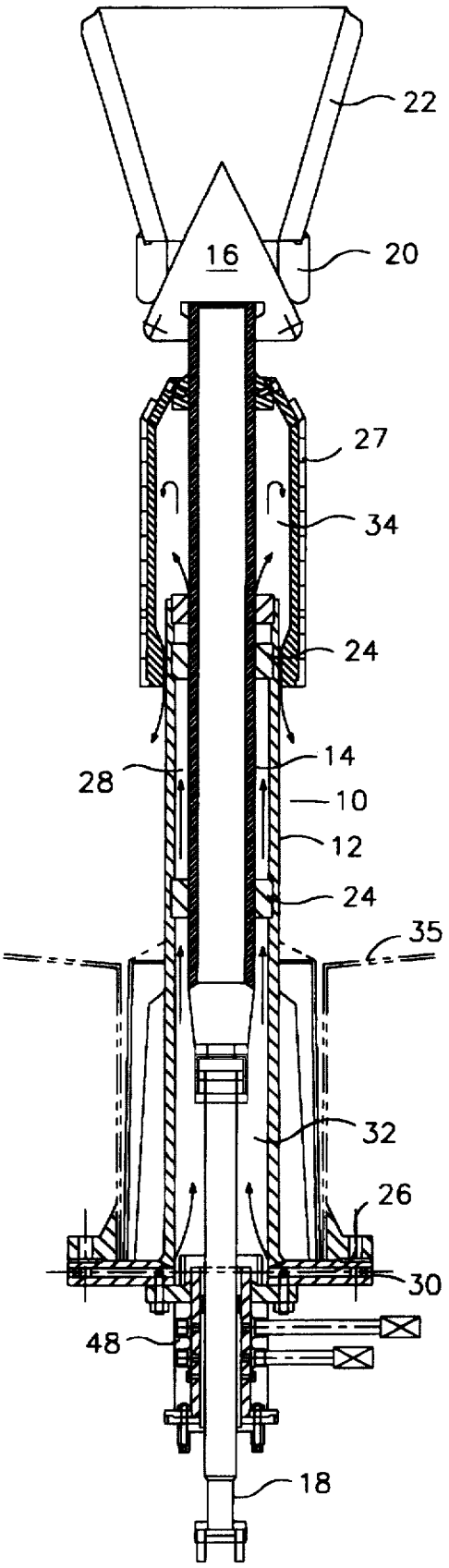
FIG. 1 is a side view in cross section of a prior art continuously purged plug valve in which fluidized solid particles flow downwardly by gravity into a vessel or chamber.

Referring now to FIG. 1, a prior art plug valve 10 is illustrated which has a guide tube 12 within which is movably disposed a hollow stem tube 14. A plug closure member 16 is secured to one end of the stem tube 14. An actuator (not shown) is connected to the other end of the stem tube 14. The actuator moves the stem tube 14 up and down within the guide tube 12 to open, close, and to effect the size of the opening between the plug closure member 16 and a valve seat 20 connected to the conduit 22 or so that the plug closure member 16 can be seated on the seat 20 to prevent flow through the conduit 22 and moved away from the seat 20 to allow flow through the conduit 22.

Guide liner bearings 24 facilitate the movement of the stem tube 14 in the guide tube 12. A shroud 27 secured to the valve stem 14 protects the stem tube 14 from erosion otherwise due to catalyst flow against the stem 14.

A continuous purge system 26 is provided which is in communication with an annular space 28 formed between the guide tube 12 and the stem tube 14. A suitable purge fluid or medium such as air, nitrogen, or steam (with steam traps) is flowed through the inlet 30 into the chamber 32 which is in fluid communication with the annular chamber 28. A fluid pressure or pumping source (not shown) pumps the fluid to the inlet 30 at a desired pressure. A pressure indicator (not shown) is connected in the purge system for providing pressure reading for the fluid flowing in the chamber 28.

The purging system 26 provides continuous purging for the space 32, the annular space 28 between the guide tube 12 and the stem tube 14, for the bearings 24, the space 34 between the shroud 27 and the stem tube 14 and exits out the lower end of the shroud 27 as indicated by the arrows. Thus, the purging system of the prior art plug valves is a continuous system in that the purging medium is flowing and hence purging continuously. As previously indicated, however, purges often do not operate properly in practice. In the case of excessive purging, the guide tube 12, the stem tube 14, and the guide liners or bearings 24 erode. In the case of inadequate purging, solid particles enter the spaces 28 and 32 and the guide liners or bearings 24 and cause sticking of the valve stem 14.

The prior art plug valve illustrated in FIG. 1 is mounted in a vessel designated by the dotted lines 35 and is shown in a vertical position in which a catalyst stream flows from the conduit 22 into the vessel 35, for example a regeneration vessel, when the plug closure member 16 is moved downwardly away from the valve seat 20. The regenerator vessel 35 is disposed about the plug valve and serves to contain fluidized catalyst. The plug valve 10 controls the level of catalyst in the regenerator.

Figure 2:
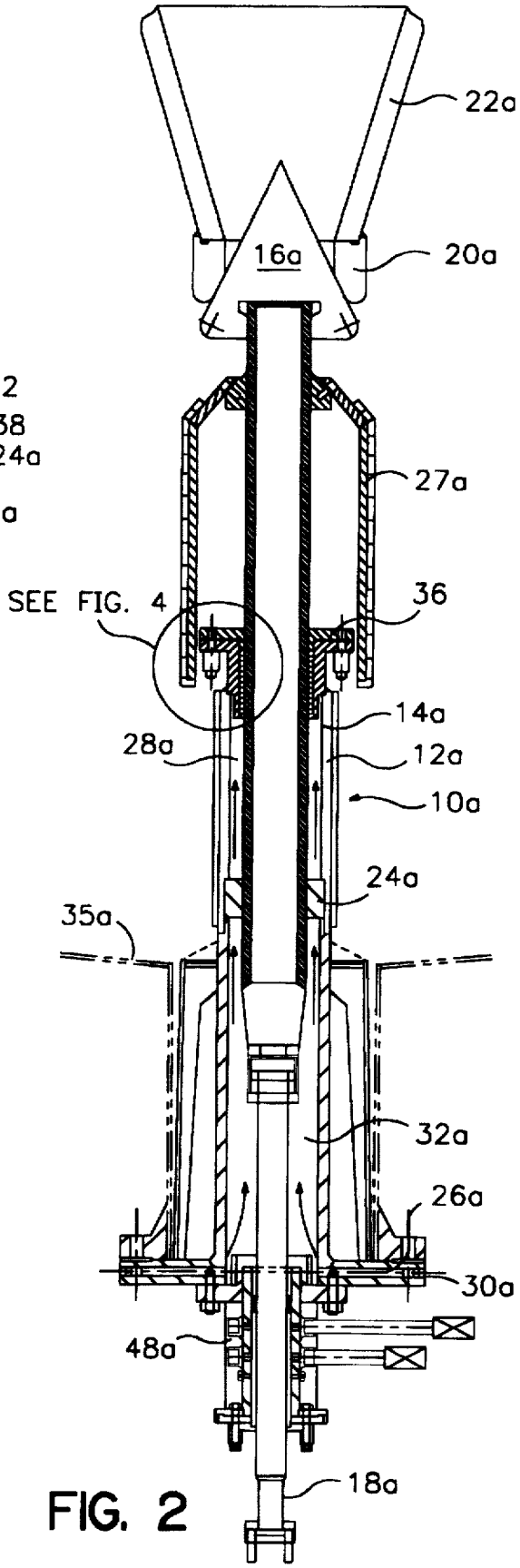
FIG. 2 is a side view in cross section of a plug valve according to the present invention in which fluidized solid particles flow downwardly by gravity into a vessel or chamber.

Referring now to FIG. 2, a plug valve 10a according to the present invention is illustrated which has various parts similar to those of prior art plug valves, and particularly the plug valve of the prior art illustrated in FIG. 1. Numerals common to FIGS. 1 and 2 indicate similar parts, the reference letter "a" being applied to the numerals designating these common parts in FIG. 2. As the case in FIG. 1, the plug valve 10a is vertically mounted in a vessel 35a, and flow of catalyst fluid is downwardly through the conduit 20a and the valve seat 20a into the regenerator vessel or chamber 35a when the plug valve 10a is in open position.

In the plug valve embodiment of FIG. 2, a closed or contained purging system is utilized which provides a purging medium contained under pressure in the space 32a and the annular space 28 and the purging medium only flows when there is leakage due to wear on the seals utilized. To this end, a stuffing box 36 is provided at the upper end of the guide tube 12a which seals the upper end of the annular space 28a and a stuffing box 48a is disposed at the lower end thus containing the purging medium within the spaces 32a and 28a. Advantageously, by this arrangement there is no normal purge consumption, and there is no erosion on the outside diameter of the guide tube due to elimination of the purge. The purge is installed as a backup only. The purge medium is connected to a continuous supply of clean air, nitrogen, or steam (with steam traps) preferably regulated to a pressure 5 to 10 psi above the operating pressure of the valve, which supply is not shown. In the case of packing leaking, the purge medium leaks into the valve.

Figure 4:
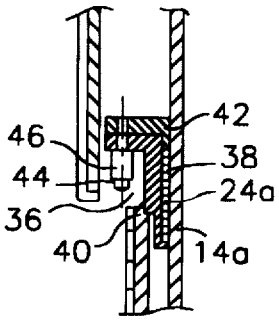
FIG. 4 is an enlarged partial view of a stuffing box sealing one end of the confined space between the stem tube and the guide liner and a removable shroud protecting the stuffing box from erosion.

As best seen in FIG. 4, the stuffing box 36 includes the packing rings 38, a packing gland 40, a following flange 42, bolts 44, and spring washers 46 for urging the packing 38 into sealing engagement with the outer wall of the stem tube 14a.

Any type of desired stuffing boxes may be utilized which will contain the purging medium in the spaces 28a and 32a between them so that the purge medium system serves as a backup and only starts purging when needed, that is, when one or both of the stuffing boxes 36 and 48a leak.

Figure 3:
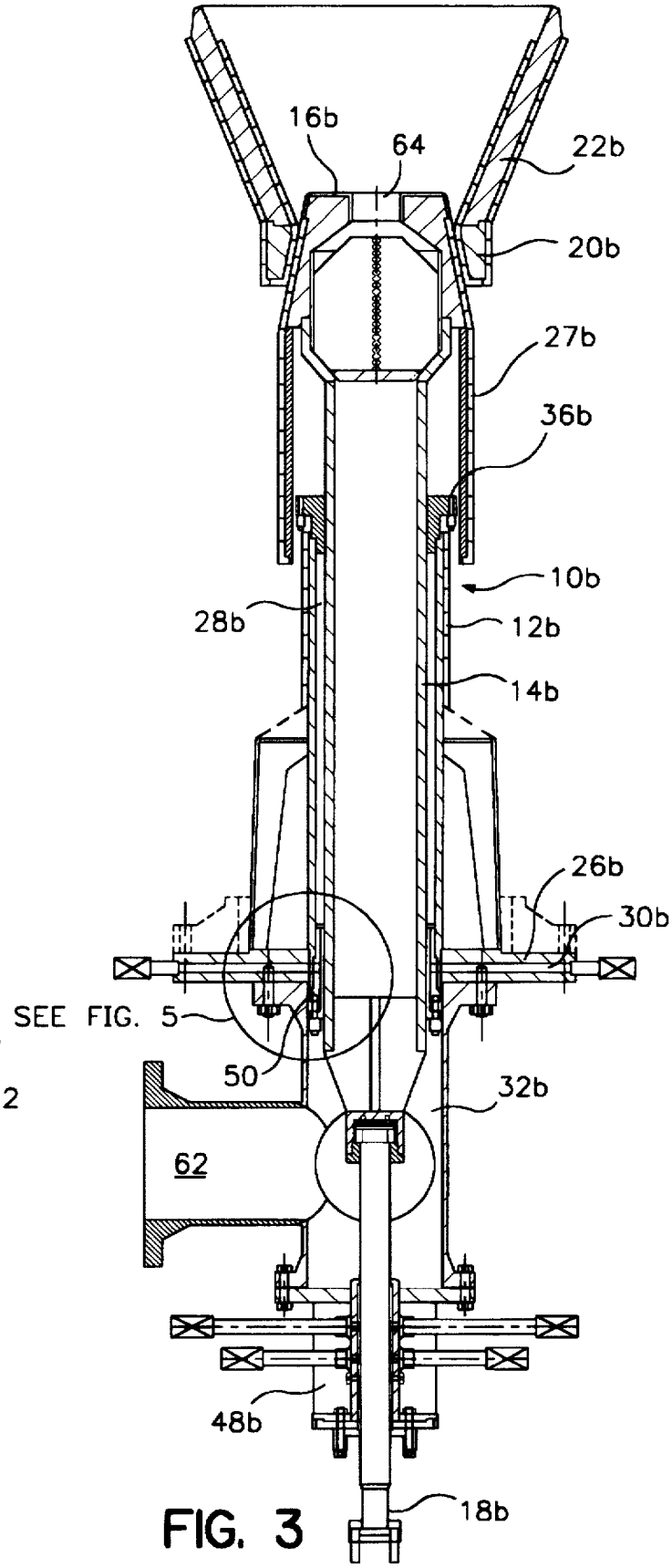
FIG. 3 is a side view in cross section of an embodiment of the plug valve according to the invention in which fluidized particle flow is aspirated upwardly from the vessel or chamber in which the plug valve is mounted.

Referring now to FIG. 3, another embodiment of a plug valve 12b is illustrated which includes various parts corresponding to those illustrated in FIGS. 2 and 4. For convenience of reference, the reference letter "b" is applied to numerals designating corresponding parts. The embodiment 10b of FIG. 3 is also a vertically mounted plug valve in a chamber for flow of fluidized catalysts; but in this case, the flow is upwardly from a chamber or vessel, such as a catalyst regeneration chamber, into the conduit 22b.

Figure 5:
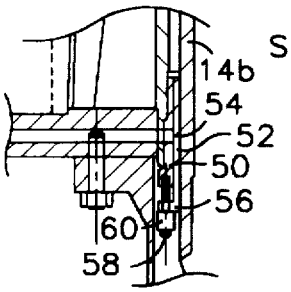
FIG. 5 is an enlarged partial view of the stuffing box at the other end of the guide liner and illustrating the purging medium entry into the space between the guide tube and the stem tube.

In the embodiment of FIG. 3, the purging medium is introduced in the inlet 30b and is confined in the annular space 28b between the guide tube and the stem tube 14b. The first or upper stuffing box 36 is the same as the stuffing box 36 of FIGS. 2 and 4. A lower stuffing box 50 is provided and is better illustrated in FIG. 5 and includes the packing 52, a purge ring 54, a following flange and packing gland 56 (here shown as made in one piece), a bolt 58, and spring washers 60 for urging the packing 52 into sealing engagement with the outer surface of the stem tube 14b. As is the case with the stuffing box 36b, the stuffing box 50 can take any desired form to urge the packing 52 into sealing engagement with the outer surface of the stem tube 14b.

Thus, a purging medium under pressure enters the purging system 26b through the inlet 30b and provides purging medium under pressure in the annular space 28b between the guide tube 12b and the stem tube 14b, which purging medium is contained in the annular space between the stuffing boxes 36b and 50. The purging medium is provided as a backup, and purging only takes place when there is leakage of one or both of the stuffing boxes 36b and 50.

In the embodiment of FIG. 3, an aspirating or propelling fluid is introduced into the inlet 62, flows into the space 32b, which in this case is sealed off from the purging medium by the stuffing box 50, flows into the stem tube 14b out through the opening 64 in the plug closure 16b. The plug valve 10b is illustrated in closed position; but when the plug closure member 16b is in an open position, the fluid flowing upwardly out the opening 64 in the plug closure member 16b aspirates or propels fluidized catalyst in the chamber or vessel 34b upwardly into the conduit 22b and into a chamber or vessel above, not shown.

Figure 6:
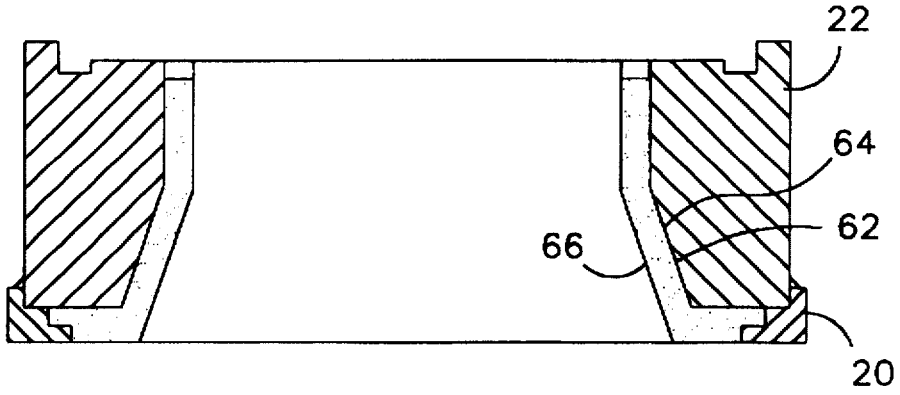
FIG. 6 is a cross sectional view of the valve seat of the plug valve of FIG. 3.

Referring now to FIG. 6, a ceramic paper 62 to dampen or absorb shock is applied on the valve seating surface 64 of the valve seat 22 upon which is a composite highly erosion resistant cast refractory material 66 to provide shock and erosion resistance to the valve seat 62.

Figure 7:
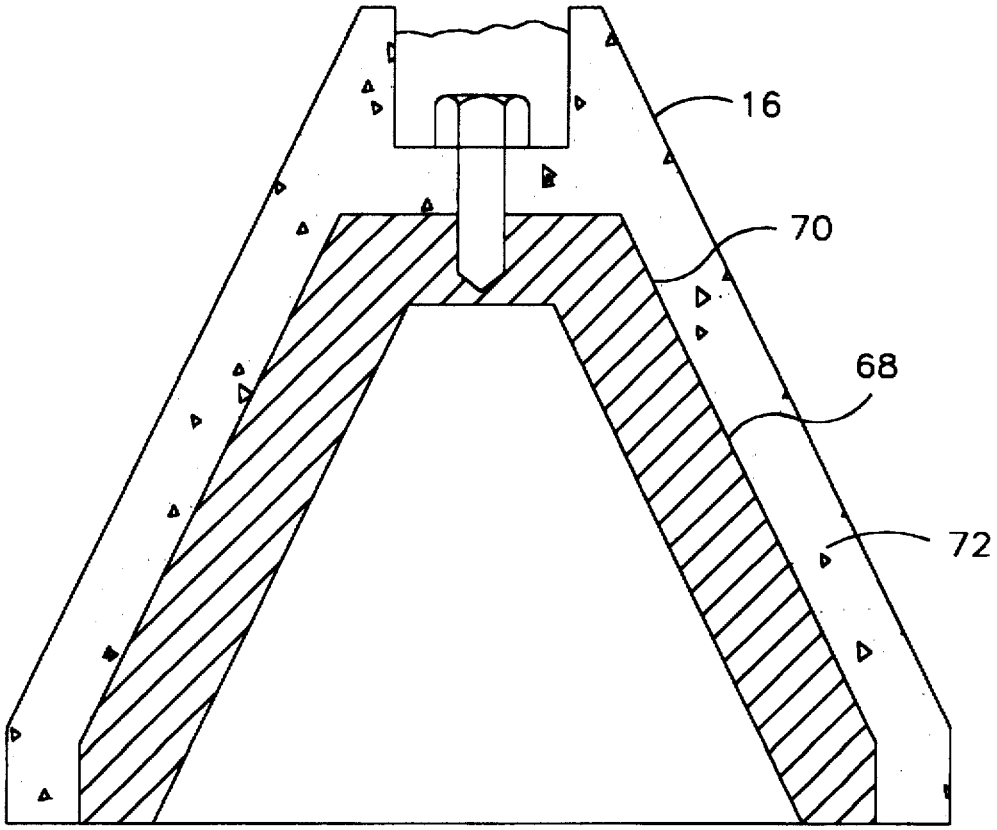
FIG. 7 is a cross sectional view of the plug closure member of FIG. 2.
Figure 8:
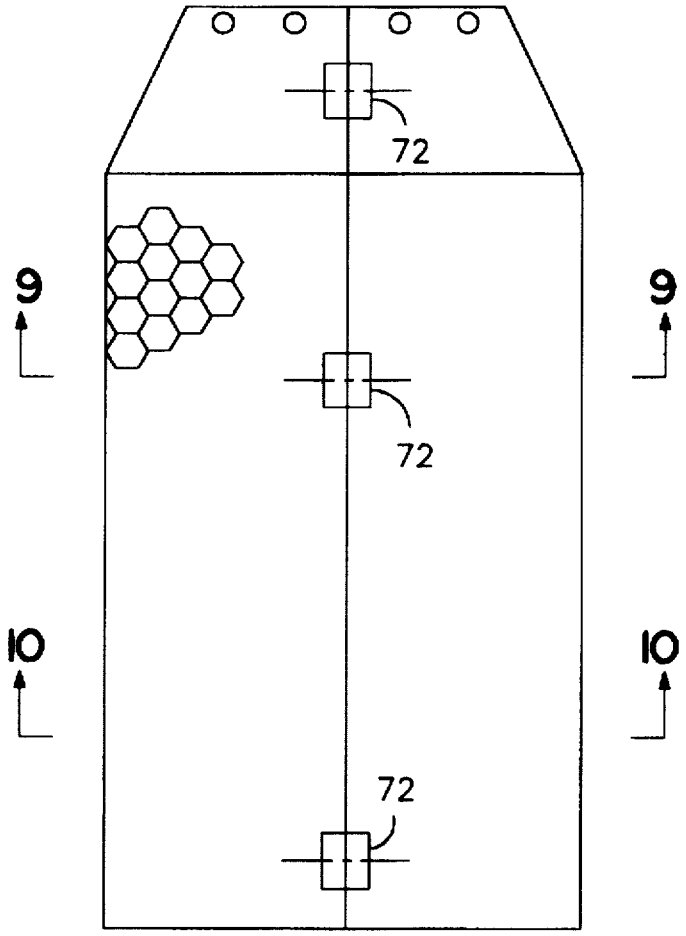
FIG. 8 is an elevational view of the removable shroud of FIGS. 2 and 3.

Similarly and with reference to FIG. 7, a shock dampening or absorbing ceramic paper 70 is placed on the outer surface 68 of the valve closure member 16 and the erosion resistant material 72 is cast on the valve closure member over the ceramic paper 70. The material 72 is not cast directly on the plug closure member 16 or the valve seat 20. It is cast separately into their shapes and then assembled to them.

Preferably, the ceramic paper should be able to sustain high temperatures and to be shaped without cracking. A presently preferred ceramic paper is Ultrafelt™ marketed by Thermal Ceramics of Augusta, Ga., although any such paper can be used which can withstand the conditions of use and dampen shock.

The presently preferred ceramic material is Corhart Corguard™ which is a fusion cast chemical composition of alumina 49 percent, zirconia 34 percent, silica 15 percent, and soda 1.5 percent by weight. The minerological composition is corundum 48 percent, zirconia 32 percent, and vitreous phase 20 percent. Corondum is alumina in the fused and crystallized state. The vitreous phase is glass from the melted silica which fills all the spaces between the corundum and zirconia crystals.

Any suitable ceramic material which can be cast separately into the desired shape, then assembled to the plug closure member and valve seat and provide erosion resistance under the conditions of use can be used Similarly, any sheet material that has shock dampening or absorbing properties under the conditions of use can be used.

Figure 9:
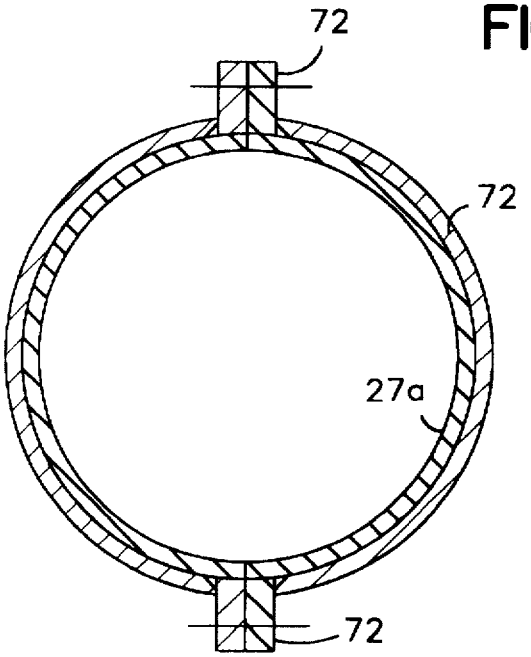
FIG. 9 is a cross-sectional view of the removable shroud of FIG. 8 taken along the lines 9—9.
Figure 10:
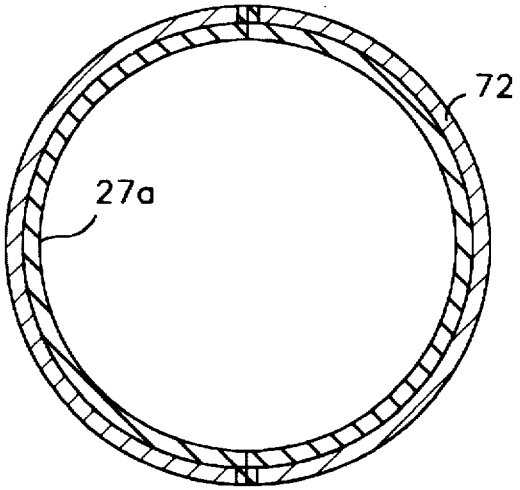
FIG. 10 is a cross-sectional view of the removable shroud of FIG. 8 taken along the lines 10—10.

The shrouds 27a and 27b are made in multiple parts, at least two parts, as illustrated in FIGS. 9 and 10, to which reference is made. The outwardly projecting lugs 72 are welded or otherwise secured to each of the two part shroud 27a and bolted together by bolts not shown. Thus, the shrouds 27a and 27b can be readily removed and replaced while the plug valve is in service.

The present invention therefore is well suited and adapted to accomplish the ends and has the advantages mentioned as well as others inherent therein.

While presently preferred embodiments of the invention have been illustrated and described for purposes of disclosure, changes and modifications can be made therein which are within the spirit of the invention and the scope of the following claims:

What is claimed is:

1. In a plug valve adapted to be placed in a chamber and to control flow of fluid between the chamber and an open end of a conduit by effecting opening and closure between the chamber and the open end of the conduit, the plug valve including a valve seat in the open end of the conduit, a plug closure member seatable in the valve seat, a movable stem connected to the plug closure member, means for moving the stem and thereby the plug closure member toward and away from the valve seat, *in one type the plug closure member effective to prevent flow through the conduit when seated on the valve seat and to allow flow through the conduit when moved away from the valve seat, and in another type including* channel means extending through the plug closure member and the stem for passage of an aspirating medium therethrough effective to aspirate fluid in the chamber into the open *end* of the conduit, a guide tube guiding the stem, a portion of the stem movably disposed within the guide tube and spaced apart therefrom thereby providing a space between the guide tube and the stem, the improvement comprising a contained pressurized back up purge system including, a first stuffing box sealingly disposed in the space between the stem and the guide tube adjacent one end of the guide tube, a second stuffing box sealingly disposed in the space between the stem and the guide tube adjacent the other end of the guide tube, purge means providing a purge medium under pressure in the space between the first and the second stuffing boxes, and the first and the second stuffing boxes effective to contain the purge medium under pressure between them in the space thereby preventing the fluid from entering the space between the stem and the guide sleeve, the purge means being effective only upon leakage of at least one of the leaking stuffing boxes to allow the flow of purge medium into the space and out of at least one or both of the leaking stuffing boxes thereby purging the space and preventing the fluid from entering the space between the stem and the guide tube.

2. The plug valve of claim 1 where, the first and second stuffing boxes are effective to guide and center the stem in the guide tube.

3. The plug valve of claim 1 including, a removable shroud disposed about the stem and the first stuffing box effective to prevent erosion on the stem and the first stuffing box by fluid circulation in the chamber.

4. The plug valve of claim 1 where, the guide tube is secured to the chamber effective to provide support for the guide tube and at least one of the first and second stuffing boxes.

5. The plug valve of claim 1 where, the valve seat and the plug close member have a cast refractory lining on each of them.

6. The plug valve of claim 1 including, a sheet of shock dampening material disposed between the refractory lining and the valve seat and the plug closure member.

* * * * *